United States Patent
Kawai et al.

(10) Patent No.: US 7,578,228 B2
(45) Date of Patent: Aug. 25, 2009

(54) AIR BALANCE STRUCTURE

(75) Inventors: Tomohiko Kawai, Yamanashi (JP); Kenzo Ebihara, Yamanashi (JP)

(73) Assignee: FANUC Ltd, Yamanashi (JP)

( * ) Notice: Subject to any disclaimer, the term of this patent is extended or adjusted under 35 U.S.C. 154(b) by 180 days.

(21) Appl. No.: 11/305,190

(22) Filed: Dec. 19, 2005

(65) Prior Publication Data

US 2006/0219095 A1  Oct. 5, 2006

(30) Foreign Application Priority Data

Dec. 22, 2004   (JP) .............................. 2004-371144

(51) Int. Cl.
*F13B 13/042*   (2006.01)
(52) U.S. Cl. ........................ 91/49; 92/DIG. 2
(58) Field of Classification Search .............. 91/49; 92/DIG. 2; 100/269.19
See application file for complete search history.

(56) References Cited

U.S. PATENT DOCUMENTS

| 397,393 | A | * | 2/1889 | Smades ................ 100/269.19 |
| 5,218,896 | A | | 6/1993 | Furukawa | |
| 5,718,160 | A | * | 2/1998 | Ohsumi .................. 92/DIG. 2 |

FOREIGN PATENT DOCUMENTS

| DE | 26 29 431 | 1/1978 |
| JP | 56-166122 U | 12/1981 |
| JP | 1-35108 | 2/1989 |
| JP | 1-112039 U | 7/1989 |
| JP | 1-181522 | 7/1989 |
| JP | 10-138081 | 5/1998 |
| JP | 2001-50210 | 2/2001 |
| JP | 2002-71860 | 3/2002 |

* cited by examiner

*Primary Examiner*—F. Daniel Lopez
(74) *Attorney, Agent, or Firm*—Staas & Halsey LLP

(57) ABSTRACT

An air balance structure that compensates for the weight load of a movable member driven in a straight line along the vertical axis, with a simplified structure and at reduced cost. The box-shaped movable member has an open bottom that accommodates the stationary member therewithin, in which state the movable member is movably supported in the vertical direction by an air bearing created using a gap between the stationary member and the movable member. An air balance chamber that contains pressurized air is formed inside the movable member. After pressure-adjusted air is supplied from the outside to the gap from a jet port through a pipe inside the stationary member, the air flows into the air balance chamber. This flow seals the pressurized air inside the air balance chamber. Pressurized air exhaust is exhausted externally from an exhaust port through a pipe and a flow adjusting device.

5 Claims, 5 Drawing Sheets

AIR BALANCE STRUCTURE

BACKGROUND OF THE INVENTION

1. Field of the Invention

The present invention relates to an air balance structure applied to a mechanism for compensating for the deadweight of movable members that move along a vertical axis in, for example, precision measuring instruments, precision machine tools and precision machining tools.

2. Description of the Related Art

Most precision instruments, machine tools and machining tools for which precise operation is required have movable members that move up and down along a vertical axis. Movable members that move along a vertical axis (hereinafter called vertical axis movable members), unlike those that move along the horizontal axis, ordinarily require a mechanism to compensate for the gravitational pull exerted by their own deadweight. As a mechanism of this sort either a counterbalance system or an air balance system is generally used to compensate for the force of gravity. Of these two systems, the counterbalance system requires the installation of a weight that is the same weight as the movable member as the counterbalance. This arrangement has two disadvantages: It hinders efforts to make the entire apparatus compact, and it unavoidably increases the overall apparatus weight by the equivalent of the weight of the movable member.

By contrast, the air balance deadweight compensation mechanism, although it does not compensate for the force of gravity acting on the movable member with an equivalent weight, does require a seal means that contains pressurized air that generates a balancing force. Moreover, if high-precision operation is required of the movable member, the seal must be a non-contact seal, that is, a contactless seal.

FIGS. 1 and 2 are diagrams illustrating an air balance structure used in a contactless seal-type air balance used conventionally (that is, a structure for compensating for the force of gravity with an air balance system), with FIG. 1 showing a general external view of the air balance structure and FIG. 2 showing a schematic cross-sectional view of the structure along a line A-A shown in FIG. 1.

In FIG. 1, an air balance structure designated in its entirety by reference numeral 1, includes a stationary member 10 and a movable member 20. The movable member 20 has a substantially square cylinder shape, with the stationary member 10 inserted through the open bottom of the movable member 20. Reference numeral 14 designates a gap between the outside surface of the stationary member 10 and the inside surface of the square cylinder-shaped movable member 20, having a width great enough (for example, several millimeters) to permit the free passage of air.

The movable member 20 is supported so as to be movable up and down (in the direction of gravity) in a straight line with respect to the stationary member 10 by a vertical axis straight line drive mechanism, not shown. The air balance mechanism is provided in order to reduce the weight load on this line drive mechanism. As can be easily understood by an examination of FIG. 2, a cylindrical concavity open toward the top is formed in the stationary member 10. The movable member 20 is provided with a bridge 21, from which a piston 22 depends. Reference numeral 23 designates a shaft connecting the bridge 21 and the piston 22.

The piston 22 has an outer diameter that just fits the cylindrical concavity, so as to form an air balance chamber with the bottom of the concavity. A pressure adjusting device 30 supplies pressure-adjusted, compressed air to this air balance chamber 11 via pipes 31, 12. The air is pressurized to a value that is just capable of offsetting the load weight exerted by the movable member 20. Thus, the conventional air balance structure pushes the piston 22 up and generates a balancing force that cancels out the deadweight of the movable member 20 by pressurizing the air balance chamber 11 with air adjusted to an appropriate pressure with the pressure adjusting device 30, and therefore requires high-performance air sealing.

Although for purposes of illustration the gap 13 formed between the inside wall of the concavity and the side of the piston 22 is shown as being approximately the same as the gap 14 described above, in actuality the gap 13 is smaller than the gap 14 and is in general 20 microns or less, so as to minimize the leakage of air from the interior of the air balance chamber 11. If the gap 13 that seals the air in is large, then the leakage of air from the air balance chamber 11 increases as well, which not only increases the consumption of air but also the flow of air, and the flow of air generates vibrations that interfere with the precise placement of the vertical axis. It is for this reason, then, that the gap 13 is usually held to 20 microns or less, but it should also be noted that flow of air through this tiny gap 13 is not linearly correlated with the size of the gap 13, and thus even a small change of several microns in the size of the gap 13 can cause large changes in the flow of air.

Therefore, not only must the gap 13 be small, but the vertical movement of the piston 22 must be steady. In other words, in order to achieve a steady, stable air balance at all times as the movable member 20 moves, the cylindrical inside wall of the air balance chamber 11 must extend accurately in the direction of movement of the movable member 20. In addition, if there are localized areas of excessive narrowness in the gap 13, then friction will arise between the piston 22 and the inside wall of the cylinder, thus interfering with the smooth movement of the piston 22 and therefore of the movable member 20.

Accordingly, the dimensional accuracy and the assembly accuracy required of the components that comprise the air balance are on the order of microns. Consequently, although there is little concern that the air balance mechanism adds weight, it does require a structure that seals in pressurized air, thus complicating the entire mechanism and increasing the manufacturing and machining costs of the components that are used. No publications disclosing a technology that remedies the defects of the air balance mechanism have been found.

In order to drive the movable member along the vertical axis with high precision, it is important to keep the balancing force that cancels out the weight load steady. However, as described above, with the conventional air balance structure, in order to keep the gap (that is, the seal) between the piston and the inside wall of the cylinder, the machining ands the assembly of the air balance structure components must be performed with high precision. As a result, manufacturing costs naturally increase.

SUMMARY OF THE INVENTION

The present invention provides an air balance structure of simple structure, such that, by reducing the precision required of the air balance component machining and assembly, the cost of manufacturing can be easily reduced. More specifically, the present invention proposes to make an air bearing of the vertical axis bearing along which a movable member is driven by a line drive apparatus while giving the movable member a container-like shape with an opening and using the inside of the container-like shape as an air balance chamber.

An air balance structure for a linear drive device of the present invention comprises: a stationary member; a movable member having an inner space opened downward, the stationary member being inserted into the inner space of the movable member such that the movable member is linearly movable in a vertical direction, to form an air balance chamber containing pressurized air in the inner pace except for a space occupied by an inserted portion of the stationary member; and a fluid bearing provided between an outer surface of the stationary member and an inner surface of the movable member confronting each other, for bearing the movable member with respect to the stationary member and also sealing the pressurized air in the air balance chamber.

The fluid bearing may comprise an air bearing and exhausted air from the air bearing may be used as the pressurized air.

The air balance chamber may be provided with an exhaust port that communicates with means for adjusting a flow of the air from the exhaust port, so that a balancing force by the pressurized air is adjusted.

According to the present invention, because the air bearing is used as a means of sealing in air, the high degree of machining precision and assembly precision for the components to be used like that required by the conventional art described above is not required, thus enabling manufacturing costs to be easily reduced. In other words, the present invention has the advantage that the air bearing is capable of utilizing a gap of approximately 5 μm, and moreover, can also be used as sealing means for the pressurized air that provides the balancing pressure. In addition, the structure is a simple one, without the need for a special mechanism for the air balance, and moreover, there is no change in the air balance as the movable member moves along the vertical axis. Furthermore, the exhaust from the surface of the air bearing is led to the air balance chamber, thus eliminating the need to supply air for the air balance. Finally, because the air bearing and the air balance mechanism form a single integrated unit, the air balance structure is very simple.

DETAILED DESCRIPTION

A detailed description will now be given of a preferred embodiment of the present invention, with reference to the diagrams.

Figure 1:
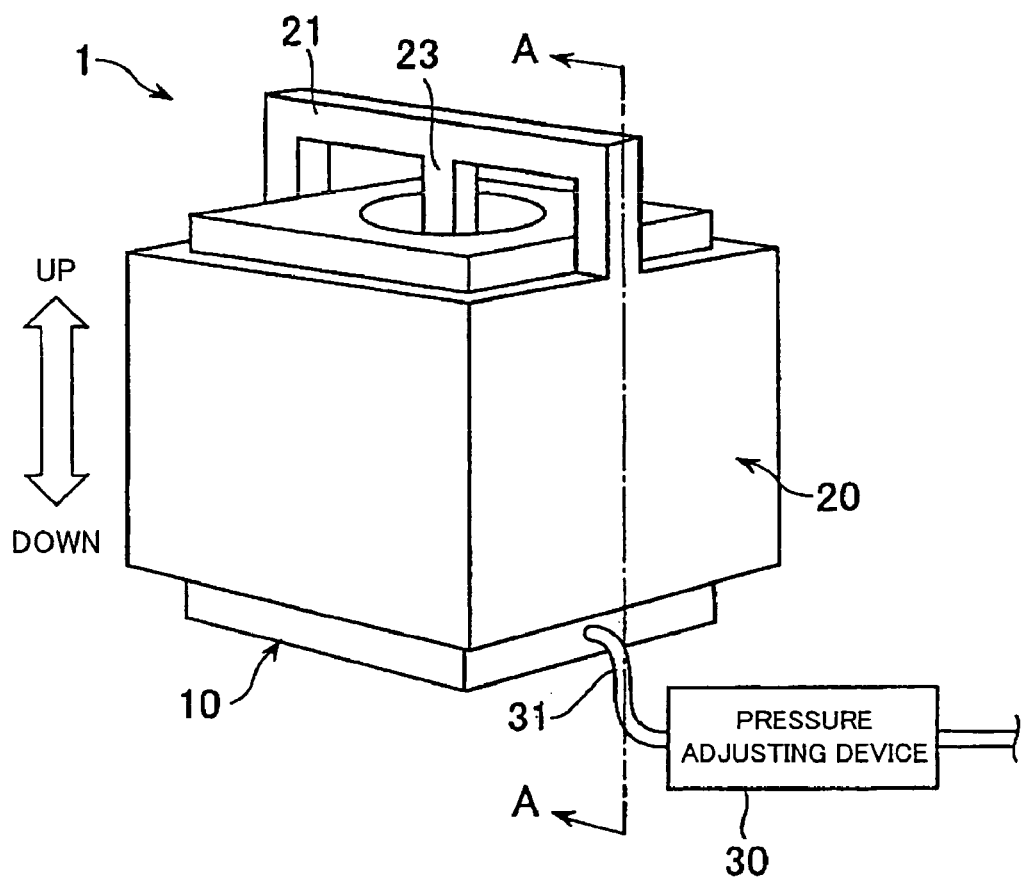
FIG. 1 is a diagram showing a general external view of an air balance structure according to the conventional art.
Figure 2:
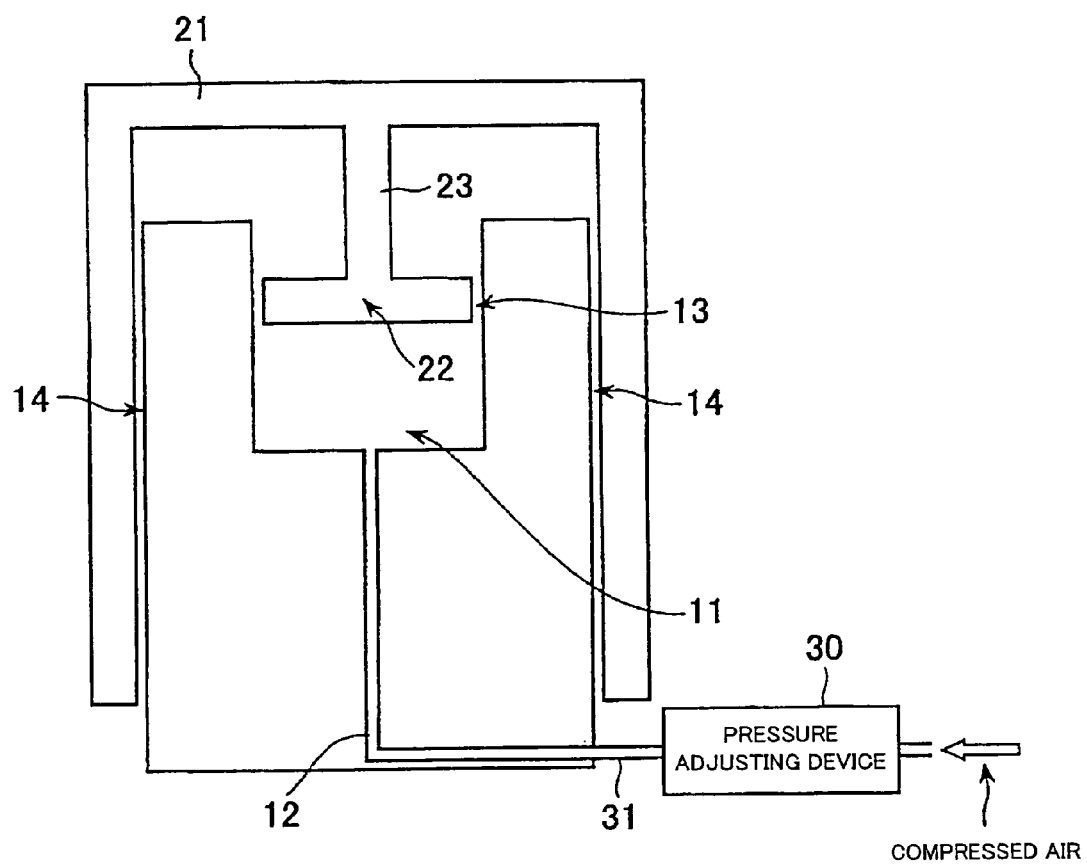
FIG. 2 is a diagram showing a schematic cross-sectional view of the structure along a line A-A shown in FIG. 1.
Figure 3:
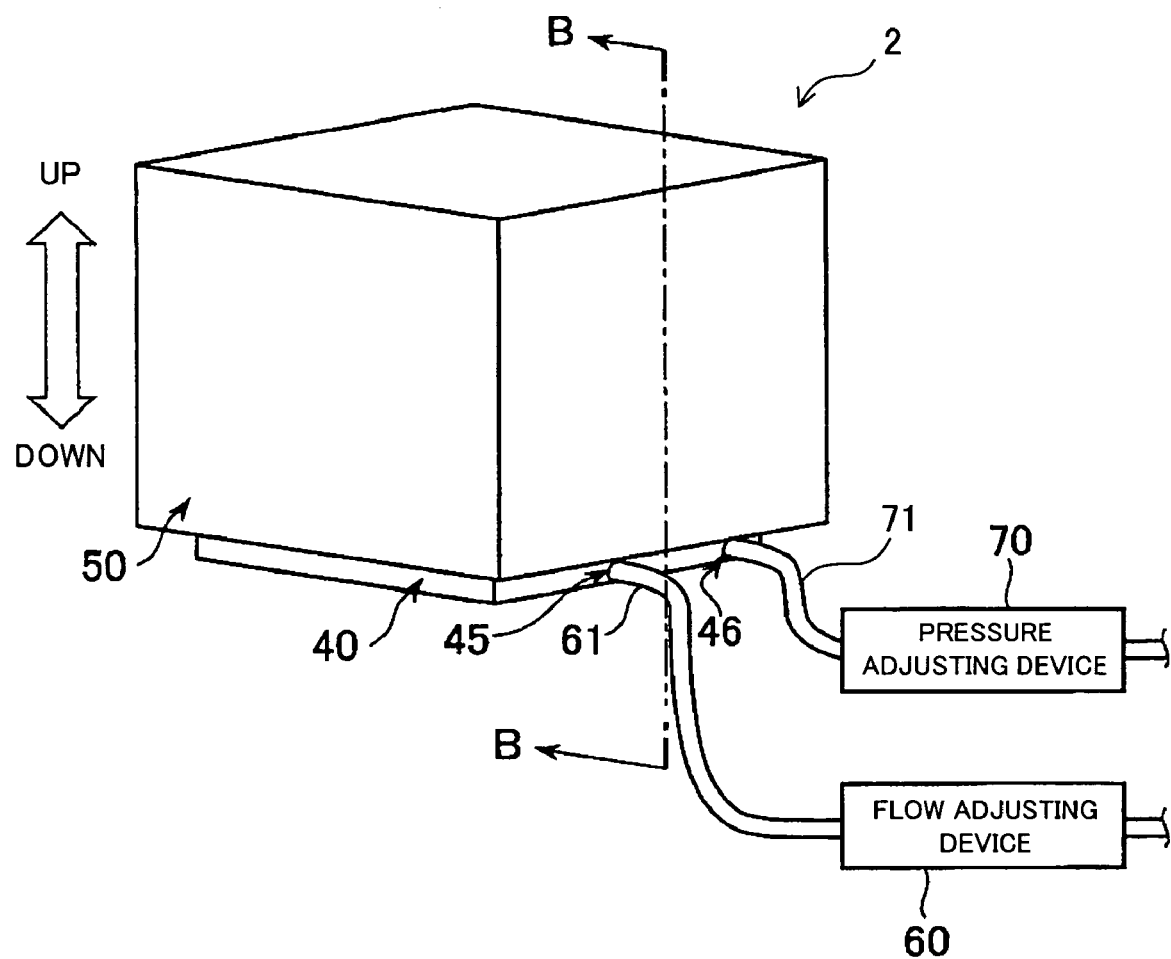
FIG. 3 is a diagram showing a general external view of an air balance structure according to an embodiment of the present invention.
Figure 4:
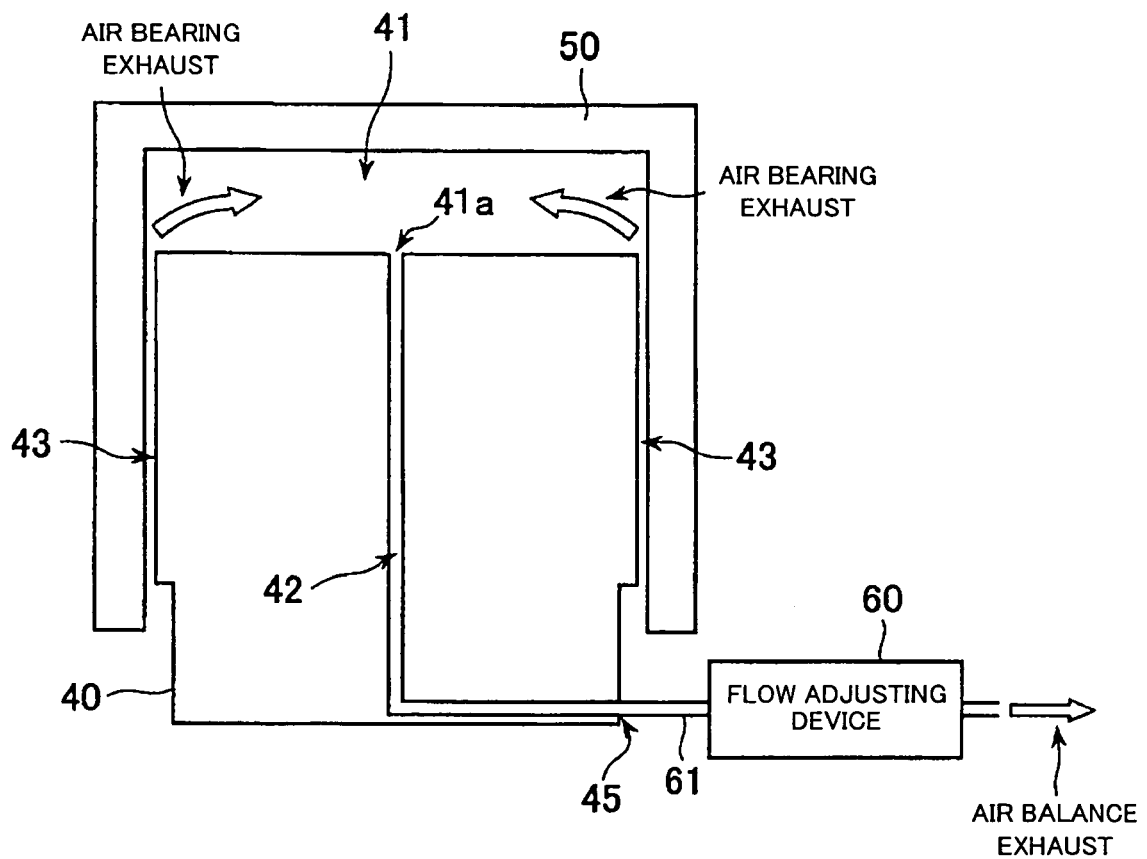
FIG. 4 is a diagram showing a schematic cross-sectional view of the structure along a line B-B shown in FIG. 3.

FIG. 3 is a diagram showing a general external view of an air balance structure according to an embodiment of the present invention. FIG. 4 is a diagram showing a schematic cross-sectional view of the structure along a line B-B shown in FIG. 1.

In FIG. 3, the air balance structure designated as a whole by reference numeral 2 includes a stationary member 40 and a movable member 50. In accordance with the distinctive feature of this invention, a container-like object with an open bottom and a box-like shape is used as one example of the movable member 50. The stationary member 40 is given a shape such as to fit within the space inside the box-like movable member 50 (here, a cube-like shape). The movable member 50 moves in a straight line up and down vertically, in the direction of the pull of gravity, in a state in which the stationary member 40 is inserted within, that is, accommodated within, the movable member 50 through the open bottom of the movable member 50. As noted in the following description, in order to support the movable member 50 in such a state, a fluid bearing (here, an air bearing) is utilized.

As can be understood from an examination of FIG. 4, the insertion of the stationary member 40 into the box-like (container-like) movable member 50 divides the space inside the movable member 50 into an area occupied by the stationary member 40 and empty space excluding that area. This empty space is used as an air balance chamber 41. In this case, in order to generate a balancing force in the air balance chamber 41, it is necessary to keep the pressurized air inside the air balance chamber 41 from escaping through a gap 43 between the stationary member 40 and the movable member 50.

If an attempt is made to make the gap 43 function as a seal by making it as narrow as the gap 13 described above, then the same problems as with the conventional art arise. In this invention, these problems are avoided by forming the fluid bearing between the outside surface of the stationary member 40 and the inside surface of the movable member 50 disposed opposite the outside surface of the stationary member 40 and by having the fluid bearing also perform the function of sealing in the compressed air. In addition, by eliminating bearing friction and driving in a straight line at high precision, the ability to employ a contactless fluid bearing is itself a great advantage.

In the present embodiment, an air bearing is employed as the fluid bearing. In other words, an air bearing that supports the movable member 50 along the vertical axis using the gap 43 formed between the outside of the stationary member 40 and the inside of the movable member 50. Furthermore, by routing the exhaust for the compressed air that is supplied to the gap 43 to the air balance chamber 41, the air bearing is also used as a source of supply of the compressed air for the air balance chamber 41.

An opening (exhaust port) 41a for a pipe 42 for the exhaust for the compressed air sent to the air balance chamber 41 is formed in the bottom of the air balance chamber 41. The pipe 42 bends after dropping straight down from the exhaust port 41a and is connected to a second pipe 61 through an opening (exhaust air port) 45 provided near the center of one side of the stationary member 40, near the bottommost edge thereof and then released externally through a flow adjusting device 60. A flow rate adjustment by the flow adjusting device 60 is set so that the pressurized air sent into the air balance chamber 41 generates the appropriate balancing force. It goes without saying that, where the pressure of the air led into the air balance chamber 41 is kept constant, increasing the flow rate by the flow adjusting device 60 decreases the air balance force, whereas if the flow rate is decreased the air balance force rises within a range that does not exceed the air balance force corresponding to the air pressure introduced into the air balance chamber 41.

The supply of pressurized air for forming the air bearing using the gap 43 is accomplished using a route that leads from an air pressure adjusting device 70 connected to a pressurized air supply source, not shown, through a pipe 71 to a bearing air intake port 46 provided along the bottom edge of one side of the stationary member 40 (the same side as the exhaust air port 45), and from there through a pipe that leads into the interior of the stationary member 40 to jet ports that open onto the gap 43.

Figure 5:
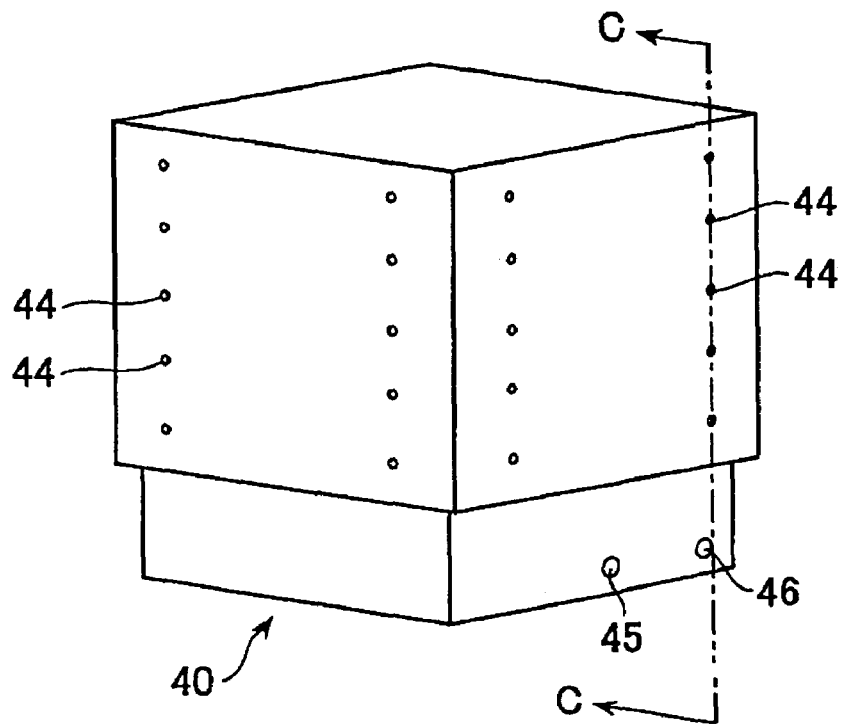
FIG. 5 is a diagram showing an external view of a stationary member of the air balance structure shown in FIG. 3.

FIG. 5 is a diagram showing an external view of the stationary member of the air balance structure shown in FIG. 3, in which a plurality of blow-off ports 44 open to the gap 43 (see FIG. 4) are provided. In this embodiment, there is one bearing air intake port 46, and consequently the bearing air intake port 46 and the jet ports 44 are connected by a branching pipe inside the stationary member 40. The configuration of this internal pipe may be determined as a matter of design convenience, and depending on the situation may be divided into a plurality of pipes corresponding to a plurality of bearing air intake ports 46.

Figure 6:
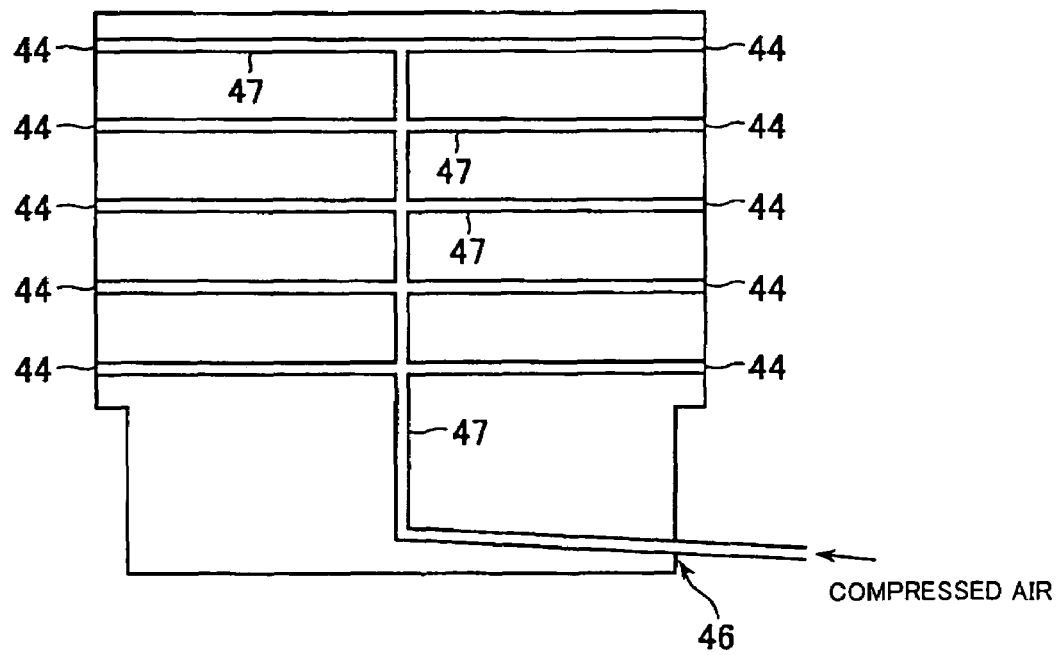
FIG. 6 is a diagram showing a cross-sectional view along a line C-C shown in FIG. 5, in order to illustrate the pipes for supplying compressed air for an air bearing.

FIG. 6 is a diagram showing a cross-sectional view of a portion of the internal piping along a line C-C shown in FIG. 5. As shown in the diagram, inside the stationary member 40, in order to lead pressurized air led from the bearing air intake port 46 to the jet ports 44 that open onto the gap 43, a pipe 47 having the required number of branches is laid. It should be noted that, although not shown, the branches of the pipe 47 are formed so as to send pressurized air to the jet ports 44 positioned away from the cross-section along the line C-C.

As noted previously, the pressurized air expelled from the jet ports 44 into the gap 43 through the pipe 47 first functions as an air bearing that supports the movable member 50 along the vertical axis, and is then sent to the air balance chamber 41 to provide the air balance function. However, a portion of the exhaust from the air bearing does not go to the air balance chamber 41 but instead flows to the outside from the bottom of the gap 43. The pressurized air sent into the air balance chamber 41 is gradually exhausted to the outside through the pipe 42 (see FIG. 4). Adjustment of the flow of exhaust is performed by the flow adjusting device 60, also as noted previously.

Thus, in the present embodiment, a contactless bearing is formed between the stationary member 40 and the movable member 50 by compressed air expelled from the plurality of air jet ports 44 on the stationary member 40 side. Here, the width of the gap 43 is one factor controlling the strength of the bearing rigidity of the air bearing. It goes without saying that the narrower the gap 43 the stronger the rigidity, and rigidity decreases as the gap 43 widens. In general, higher rigidity is required to prevent axial misalignment, and approximately 5 μm is an example that may be given of a gap size sufficient to secure adequate rigidity. In addition, the typical value for the pressure of the air that is supplied to the air bearing is 5 kg/cm$^2$.

Although exhaust is introduced into the air balance chamber 41 from the air bearing, as described above, an appropriate amount escapes from the exhaust system and the air pressure inside the air balance chamber 41 remains well below that of the air supply pressure described above. Therefore, the air in the air balance chamber 41 does not flow to the air bearing surface, and the air in the air balance chamber 41 is completely sealed, without contact, by the air bearing.

By contrast, air flows into the air balance chamber 41 from the air bearing that is at a higher pressure than the air balance chamber 41. In the present invention, the air that flows from the air bearing is used for the air balance, thus eliminating the need to supply air solely for the air balance.

It should be noted that the size of the balancing force generated by the air balance chamber 41 is proportional to the product of the air pressure inside the air balance chamber 41 and the cross-sectional surface area in the horizontal direction of the air balance chamber 41. Accordingly, the size of the air balance chamber 41 (the horizontal surface area) may be determined by design, taking into account such factors as the size of the weight load generated by the movable member 50, the air pressure that can be maintained inside the air balance chamber 41, and so forth.

It should be noted that although in the embodiment described above the movable member is given a box-like shape and the stationary member is given a rectangular shape, these shapes are illustrative and can be varied as needed. For example, a variety of combinations of shapes are permitted, such as a cylinder open at one end for the movable member and a closed cylinder for the stationary member, a hexagonal cylinder open at one end for the mop and a closed hexagonal cylinder for the stationary member, and so forth.

What is claimed is:

1. An air balance structure for a linear drive device, comprising:

a stationary member;

a movable member having an inner space opened downward, a portion of said stationary member being inserted into the inner space of said movable member such that said movable member is linearly movable in a vertical direction, to form an air balance chamber containing air in the inner space of the movable member which is not occupied by the inserted portion of said stationary member; and an air bearing provided between an outer surface of said stationary member and an inner surface of said movable member confronting each other, for bearing said movable member with respect to said stationary member and also sealing the air in the air balance chamber, wherein weight of said movable member is balanced by a force due to the air in the air balance chamber pressurized only by exhausted air from the air bearing, and the air balance chamber is provided with an exhaust port that communicates with means for adjusting a flow of the air from the exhaust port so that the force due to the air exhausted air from the air bearing is adjusted.

2. An air balance structure according to claim 1, wherein the stationary member has a plurality of blow-off ports connected with pipes inside the stationary member so that the air is provided through the pipes and exhausted through the air bearing, into the air balance chamber.

3. An air balance structure according to claim 1, wherein the stationary member has a substantially rectangular shape.

4. An air balance structure according to claim 1, wherein the stationary member has a substantially cylindrical shape.

5. An air balance structure according to claim 1 wherein a gap between the outer surface of said stationary member and the inner surface of said movable member is less than 5 μm.

* * * * *

UNITED STATES PATENT AND TRADEMARK OFFICE
CERTIFICATE OF CORRECTION

PATENT NO. : 7,578,228 B2 Page 1 of 1
APPLICATION NO. : 11/305190
DATED : August 25, 2009
INVENTOR(S) : Tomohiko Kawai et al.

It is certified that error appears in the above-identified patent and that said Letters Patent is hereby corrected as shown below:

Column 6, Line 46, before "exhausted" delete "air".

Column 6, Line 57, change "claim 1" to --claim 1,--.

Signed and Sealed this

First Day of December, 2009

David J. Kappos
*Director of the United States Patent and Trademark Office*